United States Patent [19]
Buettner et al.

[11] Patent Number: 5,412,519
[45] Date of Patent: May 2, 1995

[54] OPTIMIZATION OF DISK DRIVE SPINDLE SPEED DURING LOW POWER MODE

[75] Inventors: Donald C. Buettner; Wayne J. Rothschild; Gordon J. Smith, all of Rochester, Minn.

[73] Assignee: International Business Machines Corporation, Armonk, N.Y.

[21] Appl. No.: 112,407

[22] Filed: Aug. 26, 1993

[51] Int. Cl.$^6$ .............................................. G11B 15/46
[52] U.S. Cl. .................... 360/73.03; 360/75
[58] Field of Search ..................... 360/73.01, 73.03, 75, 360/71

[56] References Cited

U.S. PATENT DOCUMENTS

| | | | |
|---|---|---|---|
| 3,638,089 | 1/1972 | Gabor | 318/318 |
| 4,458,273 | 7/1984 | Johnson | 360/74.1 |
| 4,497,002 | 1/1985 | von der Heide et al. | 360/97 |
| 4,777,544 | 10/1988 | Brown et al. | 360/75 |
| 4,987,502 | 1/1991 | Freeze | 360/75 |
| 5,043,834 | 8/1991 | Kubo et al. | 360/105 |

FOREIGN PATENT DOCUMENTS

| | | | |
|---|---|---|---|
| 61-170960 | 8/1986 | Japan | G11B 19/28 |
| 62-129971 | 6/1987 | Japan | G11B 19/20 |
| 2195581 | 8/1990 | Japan | G11B 21/08 |

OTHER PUBLICATIONS

IBM Technical Disclosure Bulletin, vol. 21, No. 8, Jan. 1979, p. 3310, by K. A. Boyles entitled "Hydrodynamic Load/Unload of R/W Head From Magnetic Disk".

Primary Examiner—Andrew L. Sniezek
Attorney, Agent, or Firm—Robert W. Lahtinen; Roy W. Truelson; Matthew J. Bussan

[57] ABSTRACT

To reduce disk drive power consumption, a reduced disk rotational velocity idle mode is used wherein in-situ components of the drive calibrate the landing (or take-off) speed of each head/disk combination and establish a transition speed incrementally above the highest landing speed to assure that the heads both fly above the confronting disk surfaces and avoid substantially all the asperities projecting from the disk surfaces. This can be accomplished using digital harmonic ratio flyheight (HRF) measurement techniques. This system optimizes the power savings to the characteristics of the particular drive. The power saving can be imposed in stages, initially to maintain the capability of quick return to operating conditions and a final stage that realizes maximum power savings. The transition speed is recalibrated periodically, which enables monitoring of the device for degradation or future imminent failure as sequential transition speeds change. Adaptive control can be implemented by extending the time between recalibration cycles when little change occurs during a series of transition speed calculations and reducing the time between recalibration cycles when significant change occurs in the sequence of transition speeds.

22 Claims, 8 Drawing Sheets

OPTIMIZATION OF DISK DRIVE SPINDLE SPEED DURING LOW POWER MODE

BACKGROUND OF THE INVENTION

This invention relates to moving storage apparatus wherein a transducer head is in contact with the storage medium surface when the storage medium is at rest and is separated from the storage medium by a fluid film when the medium is moving at operational speed and, more particularly, to a reduced media speed low power mode for such a device.

Most disk drive data storage devices experience prolonged periods of data read/write inactivity. This is particularly true for devices that run continuously overnight or during holidays. Maintaining the standby operation is a waste of energy that is a critical consideration where the system is powered from a limited power source such as the batteries of a portable device or where heat dissipation is a problem. As microcomputers become ubiquitous in the work place and tend to be continuously operational, there have appeared requirements that the power consumption of such systems meet reduced standards of power consumption. Completely powering down the device requires a relatively long wait for the drive to become ready to read or write data and frequent power on and off cycles result in increased wear and possible high stiction events that reduce the useful life of the disk storage equipment. Thus, during idle periods it is desirable to reduce power consumption while maintaining a near operational status of the device.

During idle periods, the principal power consumption is by the spindle motor, which normally maintains the full rotational velocity of the disk media despite the absence of read or write operations. The voice coil actuator motor is not required to provide access or track-follow functions and the solid state control circuitry has minimal energy requirements. With a reduction of spindle motor speed, the voice coil motor will experience fewer servo signals and make correspondingly fewer corrections such that the reduced power consumed by the spindle motor will result in a reduction of the power used by the actuator voice coil motor. In environments where the actuator is maintained at an inner or outer crash stop by a permanent magnet field, the supply of power to the actuator voice coil motor can be effectively terminated during reduced speed operation.

In the past it has been suggested that the disk drive spindle motor rotational velocity be reduced during idle periods. Reducing the spindle and media rotational velocity saves power, but also risks causing a transducer head to drag on the disk surface if the media velocity is not set correctly. Ideally, the media velocity would be reduced to the minimum possible value for the particular drive to take full advantage of the increased power savings to be obtained by lower speeds. Current approaches for motor speed reduction have no way to insure that a head or heads are not sliding on the disk, which would lead to premature failure. The only manner in which present techniques are able to reduce spindle velocity safely is by decreasing the rotational velocity by the magnitude dictated by the worst case head. This constraint means that current methods do not allow the velocity to be reduced by the maximum allowable amount for each disk drive.

SUMMARY OF THE INVENTION

The power-saving technique can be tailored to the particular drive by determining during manufacture, using a method such as harmonic ratio flyheight (HRF), which transducer head within the drive has the highest transition speed. The transition speed is the critical speed below which the head no longer flies above the media surface or contacts more than an acceptable number of media surface asperities.

Although the above technique will initially adapt the transition speed to the particular drive, it is limited in not being able to adapt the velocity setting to varying environments and to varying conditions of the drive itself that evolve through time and use. By using in-situ head/disk clearance measurement methods, such as HRF, it is possible to monitor the head/disk clearance in a drive and provide a dynamically corrected motor speed while ensuring that all heads are above the disk surface. This will mean that a drive with a low-flying head or heads will use a slightly higher spindle speed than those with higher flying heads while maintaining a given clearance above the disk surfaces. This will eliminate heads sliding along a disk surface for extended periods of time while in a low-power mode and will also take full advantage of the power-saving potential of each drive.

The in-situ head clearance measurement capability affords the ability to determine whether another head has become the most critical through altered conditions, determines whether the low power spindle speed can be lowered or requires increase and provides an element that may be a part of an optimized algorithm which balances power savings, response time and reliability requirements.

The establishment of a low-velocity power-saving mode can also be used to monitor the status and condition of the disk drive on a continuing basis over the life of the drive as the head/disk combinations are periodically resampled to recalculate the low-power mode. In addition to redetermining the head within the drive with the highest transition speed for the low-power mode, each head/disk combination can be evaluated based upon a sequence of samples to determine whether there is a likelihood of failure and how soon the degradation will impair disk performance. The change in the sampled values can also be utilized to adaptively alter the time between recalibration cycles, extending the time if little or no change has occurred or shortening the time between recalibration cycles when the sample sequence indicates changing status or conditions.

DETAILED DESCRIPTION

Figure 1:
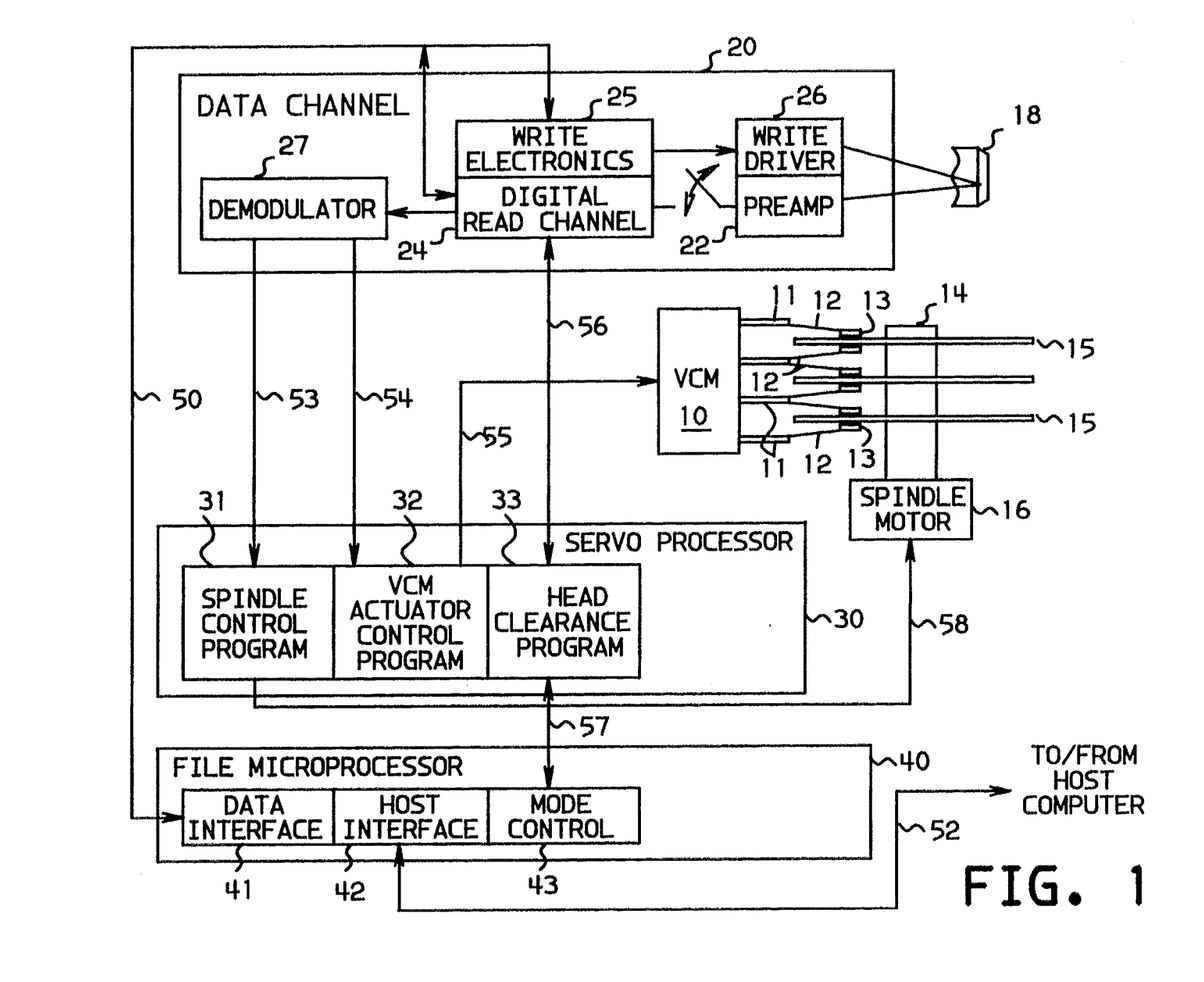
FIG. 1 is a schematic illustration of a typical rigid disk drive and control circuitry incorporating the present invention.

FIG. 1 illustrates a disk drive assembly and includes a voice coil motor (VCM) assembly 10 with attached arms 11, suspensions 12 and transducer carrying heads 13. A spindle assembly includes a hub 14, rigid disks 15 and a spindle motor 16. The heads 13 "fly" on both the top and bottom ,surfaces of disks 15 as they read and/or write data on the magnetic material deposited on the surfaces of the disks. The heads 13 fly over the confronting disk surface, supported by a bearing or film of fluid such as air induced between the disk and the head in response to the high-speed rotation of the disk.

The electromagnetic transducer 18 supported by each head is connected to a data channel, one of which is indicated by reference numeral 20. The read and write electronics portions of the data channel 20 are connected to an individual head by conventional means such as a flexible cable. As a disk rotates adjacent to an individual head, a signal is read from a track on the surface of the disk by electromagnetic detection in the head transducer and then is amplified using a preamplifier 22. The output of preamplifier 22 is fed to data channel read electronics 24, which filter and equalize the amplified signal and which typically employ a peak detection procedure to detect data in the amplified, processed signal. The channel read electronics 24 may also include clocking circuits to extract a data clock.

The data channel 20 also includes write electronics 25 which may precondition a data signal to be written on a disk track. The write electronics provide the signal which is to be recorded to a write driver 26 that is conventionally connected to a head transducer for writing onto a disk track. In the commonly used inductive head, a single transducer is used for both read and write functions, while in a magneto resistive head, separate transducers are used for reading and writing data.

The disk drive of FIG. 1 also contains processing components, including a servo processor 30 and file microprocessor 40. Conventionally, the servo processor 30 may include an invokable application run on a separate microprocessor or the drive microprocessor 40. The servo processor 30 includes a spindle control program component 31 and a VCM actuator control program 32. The servo processor is provided to control the actuator assembly, including the VCM 10, arms 11 and suspensions 12, to position the heads 13 at fixed radial locations over the surfaces of disks 15. The positioning function of the actuator control program 32, either moving heads to an addressed concentric track or maintaining the heads in alignment with a selected track, is essentially conventional, employing servo signals written continuously on a dedicated disk surface or into dedicated servo sectors on each of the disk surfaces. These signals are respectively read by one or all of the heads 13 and fed back to the signal processor 30 through read channel electronics 24 and a demodulator 27. The actuator program 32 functions to move an actuator to a desired track location and to cause the actuator to remain aligned with or follow the selected track by reduction of position error. The actuator control program implements track following, track seeking, head registration and head parking functions, which are well understood.

The drive microprocessor 40 includes a data interface section 41 which performs interface functions, including encoding and decoding of data to be written to and read from a disk, a host interface section 42 for providing control and data information to and receiving commands and data from a host computer, and a mode control section 43 for establishing and changing modes of microprocessor operation.

As shown, a clearance program 33 is provided as a component of the servo processor 30. However, the clearance program can be lodged according to design conditions in any of the microprocessor resources of the disk drive.

The major interconnections between the components of the disk drive illustrated in FIG. 1 include a data signal path 50 between the data interface 41 of the drive microprocessor 40 and the read and write electronics 24 and 25 of the data channel 20. The command/data signal path 52 connects the disk drive of FIG. 1 through its host interface 42 with the host computer (not shown). Demodulated servo signals are provided to the spindle control program 31 and actuator control program 32, respectively, from demodulator 27 over signal paths 53 and 54. The signal path 55 conducts a servo control signal to VCM 10. Signal path 58 conducts a motor speed control signal from the spindle control program 31 to the spindle motor 16. The signal path 56 connects the digital read channel electronics 24 with the clearance program 33, conducts control signals to configure the read channel electronics 24 and conducts clearance signal components to the clearance program 33 for analysis. The clearance program is enabled by an appropriate control signal sequence on signal path 57 from mode control 43. Upon receipt of a clearance command from spindle control program 31, the clearance program section 33 of the servo processor 30 takes control of the digital read channel electronics the VCM control programming 32, and the spindle control program in order to perform clearance measurements.

The clearance between any head/disk pair in the disk drive is determined by using in-situ disk drive components. Clearance is measured by employing the HRF technique, using digital electronics and the processing capacity of the disk drive, as taught in the commonly assigned patent application Ser. No. 885,578, entitled, Disk File With Clearance And Glide Measurement And Early Head Crash Warning. The measured values of head/disk clearance are stored for analysis.

The HRF technique employs a measurement signal written on a disk track, and a multi-step "spin down" of the disk speed to derive a set of points from which a velocity versus clearance curve may be derived. The measurement signal laid down in a disk surface track has a constant spectrum which generates a readback signal, including at least two different frequencies which are harmonics of the measurement signal. Preferably, the first and third harmonics are included in the readback signal. The clearance measurement procedure requires rotating the disk at operational speed, and determining the instantaneous amplitudes of the harmonic frequencies at that speed. The logarithm of the ratio of the amplitudes is indicative of the head/disk clearance. The rotational velocity of the disk is then reduced while the instantaneous amplitude of the readback signal is monitored. As is known, reduction of the rotational speed of the disk from its operational speed decreases the pressure of the air cushion on the head, thereby reducing the head/disk clearance. As the velocity of the disk is decreased, the instantaneous amplitudes of the harmonics are determined until a velocity is reached where the amplitudes stop changing. When the amplitudes stop changing, the head is assumed to be in contact with the disk. At each measurement velocity between operational velocity and the contact velocity, the ratio of the instantaneous amplitudes of the two harmonics is calculated and numerical methods are employed to derive the flying height at each measurement velocity, using the zero clearance velocity as a reference.

The HRF measurement technique can also be implemented during a spin up sequence with measurements taken during incrementally increasing speeds and terminating with the operating speed. At every incremental speed, the program switches through the sequence of heads to obtain clearance measurements for each. In addition, at each incremental speed, each head can be measured at a series of locations along the circumferential track to obtain a profile of clearance values at angular positions about the disk periphery.

Figure 2:
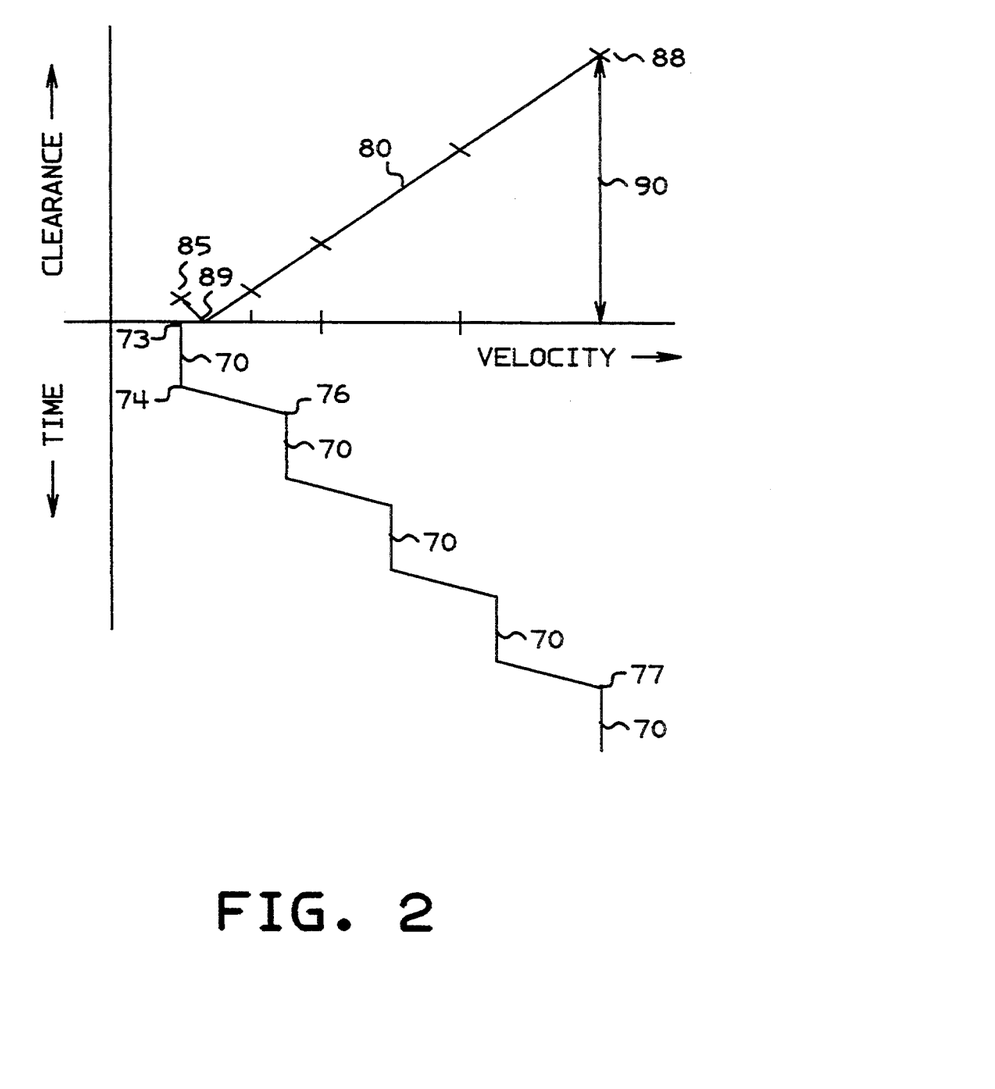
FIG. 2 is a graph showing of a "spin-up" sequence with head/disk clearance as a function of discrete disk velocities.

In FIG. 2, a head/disk clearance measurement procedure according to the HRF technique, is shown graphically. In FIG. 2, the measurement procedure reverses the sequence described above and is essentially a "spin-up" procedure. The line segments 70 give the spindle velocity as a function of time. The amount of head/disk clearance, as determined by the HRF clearance measurement is given by the curve 80, which shows head/disk clearance as a function of spindle velocity. Clearance measurement begins at 73, which coincides with start-up of the spindle motor. For each vertical line segment 70 (such as the segments between the points 73 and 74), the spindle velocity is held constant and the necessary digital measurements to determine head/disk clearance are taken. For a particular head, the digital measurement for the start-up corresponds to the point 85 on the clearance versus velocity curve 80. After all heads have been measured at start-up (which occurs at point 74), the spindle velocity is increased to point 76. Measurements for all heads are repeated at this velocity, and so on. The process continues for higher velocities until the measurements have been completed at the nominal operational velocity indicated at point 77. For the particular head given by the clearance curve 80, this point occurs at 88.

The measurement data for each head at each velocity can be processed dynamically or stored in an array for later processing. In either case, the clearance at any velocity is found by subtracting the minimal clearance measurement at point 89 from the clearance measurement at the respective velocity. For example, the nominal clearance at the operational velocity (point 88) is found by subtracting the clearance value at point 89 from that at point 88. This determination is made for each head. The most direct approach to making this measurement is to assume a mathematical function form for the continuous clearance curve 80 and then, based on measurements taken at the discrete velocities, to establish the best fit for the chosen function. From this, the minimum clearance at 89 can be found. Following this step, the clearance for each head is then simply the difference between the digital measurements made at the nominal speed (point 88) and the minimal speed (point 89), scaled by the wavelength of the recorded clearance signal. The magnitude of the clearance is shown in FIG. 2 as the distance 90.

In accordance with the present invention, the in-situ measurement capabilities of the drive are utilized to establish the low-power spindle speed. Using the digital data collected and stored by employing the HRF clearance measurement technique, the highest landing or takeoff speed among the transducer heads is determined and the low power spindle rotational velocity is set incrementally above such highest speed. Although it is theoretically only necessary to maintain the heads above the landing speed, it is prudent to use a velocity increment above the landing speed that eliminates the noise on the read channel, indicative that although the head is not dragging on the disk surface, there is an undesirable frequency of contact between the head and the disk asperities or surface irregularities.

Figure 3:
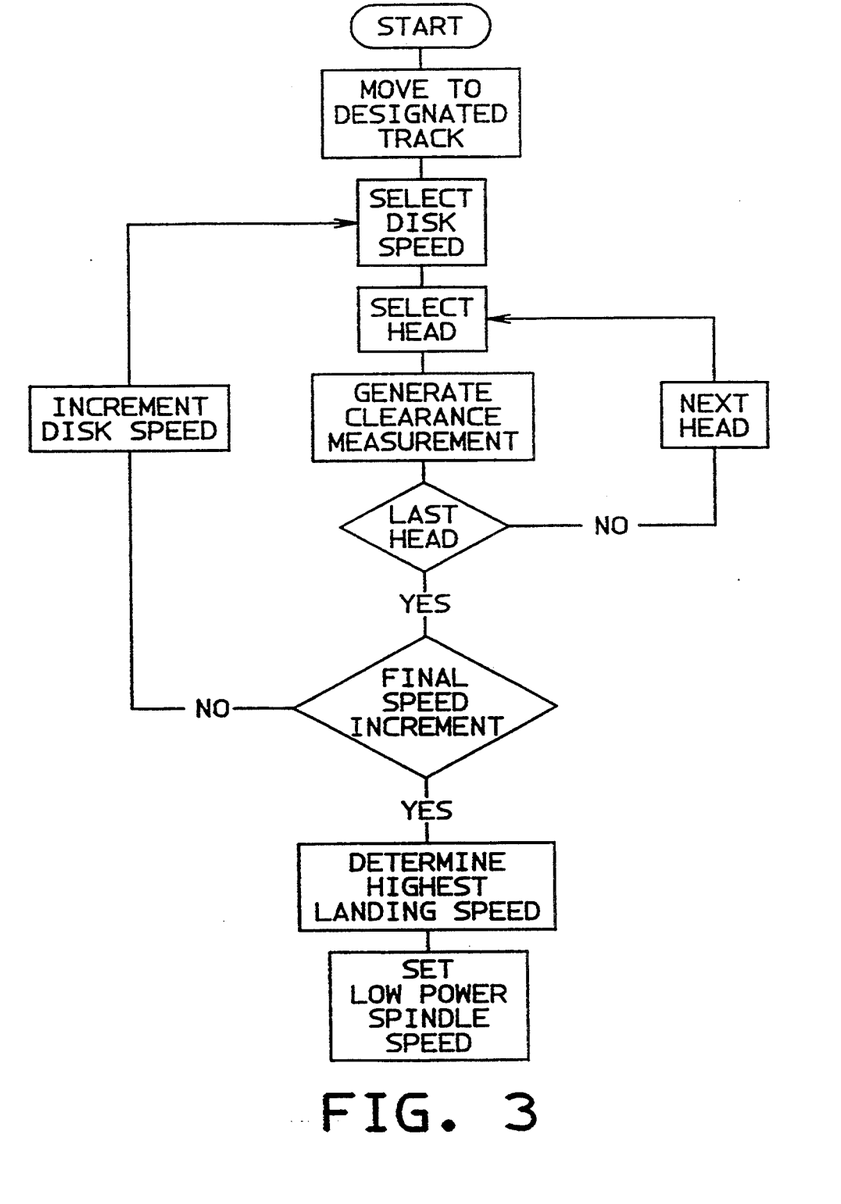
FIG. 3 is a flow diagram showing the establishment of a low-power spindle speed established using digital HRF measurements.

The sequence of measurements and speed selection is illustrated in the flow chart of FIG. 3. After moving to the track recorded for HRF measurements, an initial speed is selected. At each selected speed, every one of the heads is accessed in sequence for a clearance measurement. The stored clearance measurements enable a determination of the head/disk combination with the highest head landing speed. The low power spindle speed is then established to assure that all heads are flying above the disk surface and may be set to maintain a minimum clearance that avoids any significant head contact with disk asperities and irregularities.

The head transition speed is defined as that speed for which the head is no longer flying smoothly above the disk surface, but has instead begun to have occasional contact with disk asperities. The transition speed can be understood as an intersection of the disk asperity height distribution and the head flying height distribution. Normally, at the nominal or operating speed for a disk drive product there should be no intersection between the two distributions. At a reduced speed, however, the probability that there will be an overlap in the two distributions increases. The speed where the two distributions begin to overlap is called the transition speed. This is shown in FIG. 4.

The head transition speed can be found by measuring a sample of disks using a mechanical surface profilometer to determine the statistical distribution of asperity heights present. Next, the distribution of head flying heights is either measured using a white light interferometer or can be modeled using an air bearing simulation program. Once the head flying height distribution is known (as a function of the speed), the speed at which the head and disk distributions begin to overlap is the transition speed.

Figure 4:
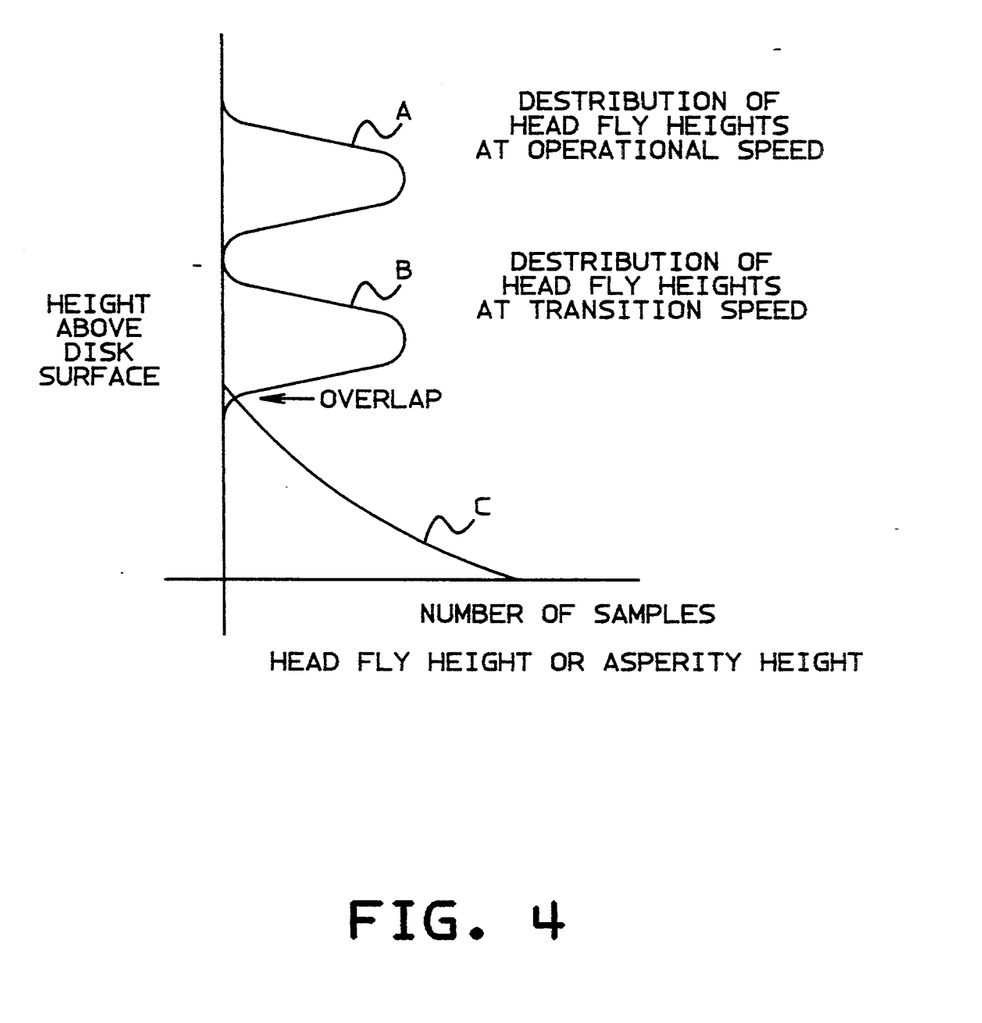
FIG. 4 is a graph showing head/disk clearance distribution at varying spindle speeds and the interrelationship with the disk asperity height distribution.

FIG. 4 shows the height above the disk surface on the Y axis with the fly height distribution of the heads illustrated by curves A and B and the distribution of disk asperity heights by curve C. Curve A shows the distribution of head fly heights with the disk rotating at the operational speed wherein the lowermost head flies substantially higher than the highest asperity as the curves are widely separated. As the disk velocity is reduced, the curve showing the head fly height distribution shows lower and lower fly heights above the disk until there is an overlap as shown by curve B.

Figure 5:
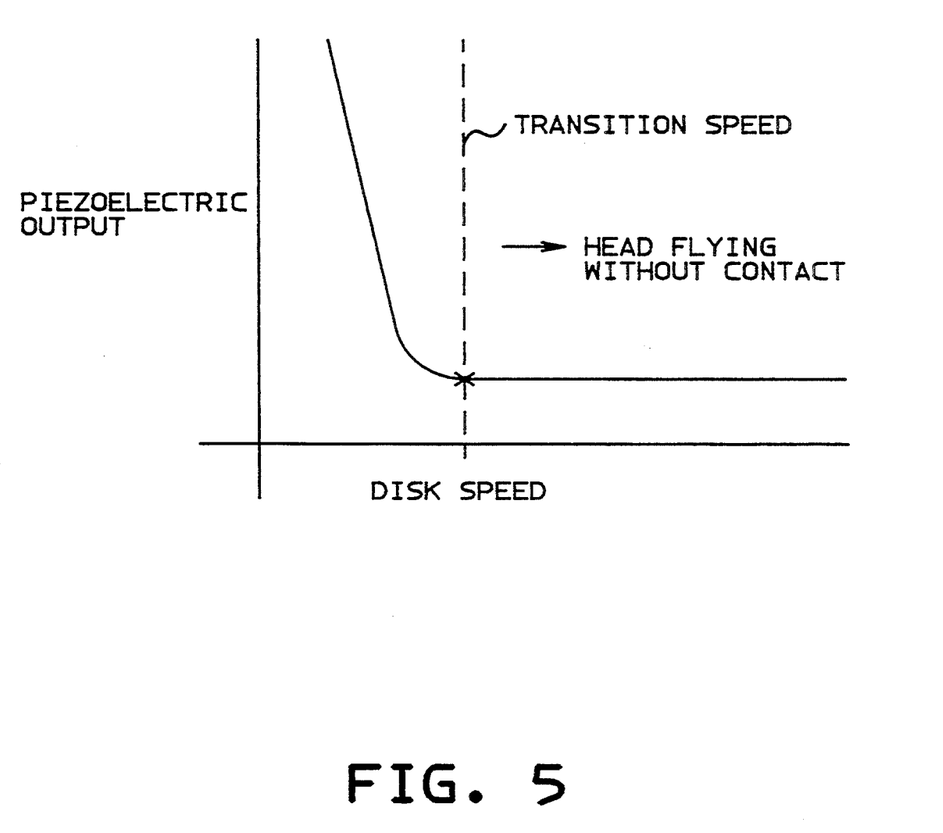
FIG. 5 graphically shows the use of a piezoelectric output for determining transition speed.

Another method that can be used to determine the transition speed does so directly. Instrumenting a sample of heads with a piezoelectric transducer will permit monitoring of head to disk contact in-situ. By adjusting the disk speed, the transition speed can be found as that speed where the piezoelectric signal begins to increase above its normal background value, as shown in FIG. 5.

Figure 6:
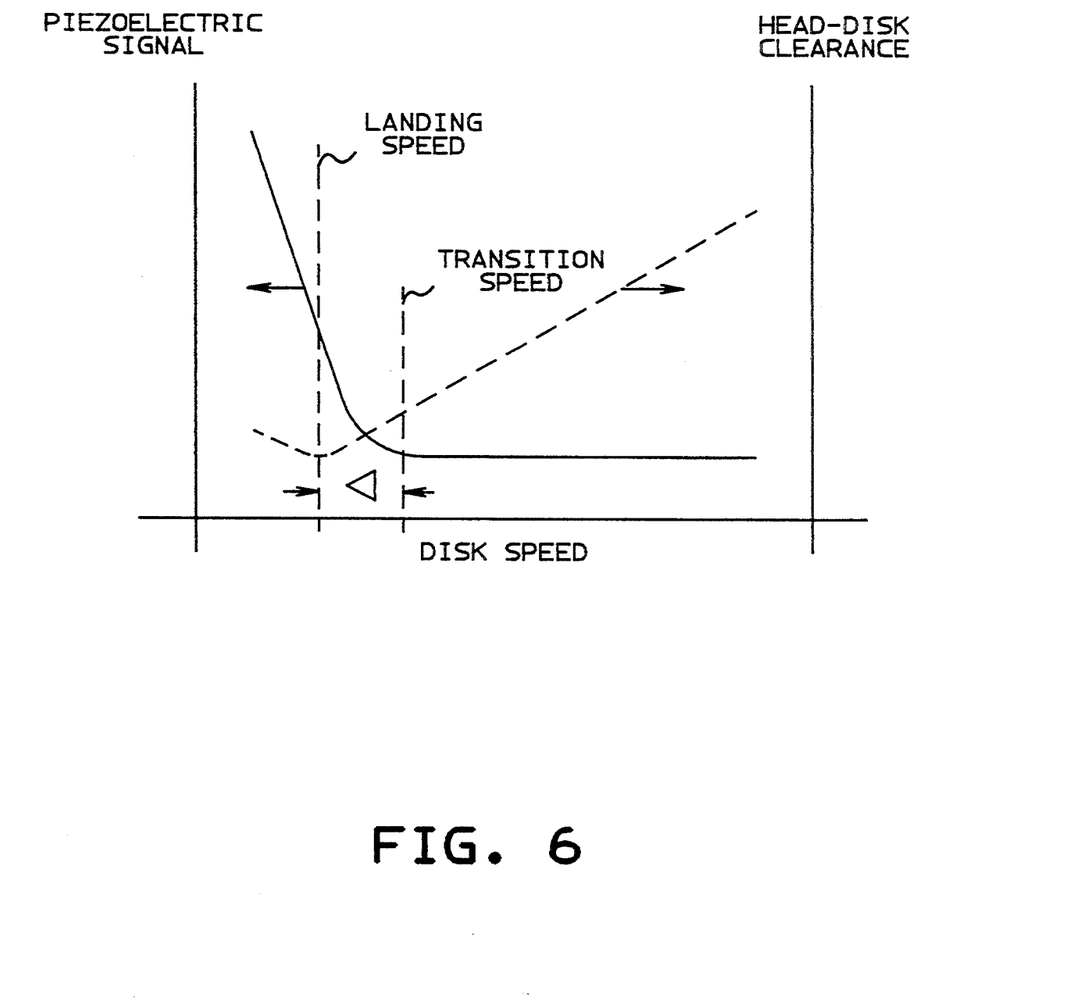
FIG. 6 graphically shows the delta or speed increment value between the head landing speed and the transition speed.

Combining the transition speed with the clearance measurement allows a determination of the required clearance to avoid head to disk contact. As shown in FIG. 6, a delta or speed increment between the landing speed and the transition speed is found. This delta is used in the product as a means to bridge between the landing speed and the required transition speed. At the file level, this delta is a constant which is added to the landing speed measured for each head. This allows a determination of the transition speed for each head.

Other factors that can modify the minimum speed used during the rotational idle are the presence of thermal asperities and head/disk contact with large defects on the disk surface. In using a reduced speed, low-power mode, the particular requirements and sensitivities of magneto resistive (MR) heads must be considered as these heads are finding progressively greater use. Thermal asperities are associated with MR heads. Contact between the MR element and a disk asperity produces heating of the element and a baseline shift of the readback signal. Repeated contact may damage the element. To avoid this situation, once the transition speed has been found for the worst-case head, all heads must be checked to determine if one or more thermal asperities are present. If one or more heads have thermal asperities, the disk speed must be further increased to avoid this condition. Similarly, if head/disk contact is identified, the speed must be increased.

Significant increases in the transition (or landing) speed for a head can indicate that the head/disk interface is degrading and that a head crash is imminent. To detect a significant change in the transition speed, many techniques are possible. The simplest is to check the transition speed of each head against a threshold. If the threshold is equalled or exceeded, a warning is issued.

Figure 7:
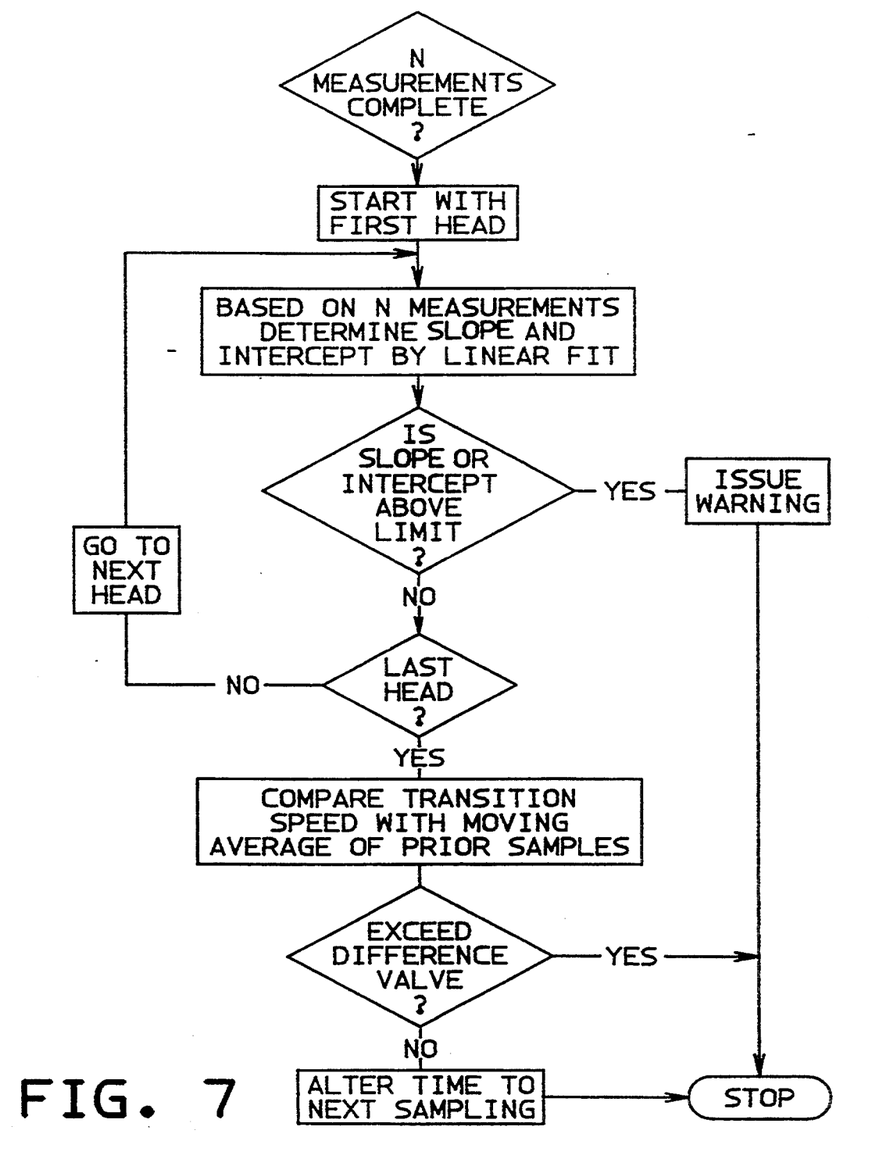
FIG. 7 is a flow chart illustrating the use of periodic transition speed sampling for monitoring disk drive condition and the adaptive altering of the period between samples as a function of the amount of variation sensed during a selected number of prior samples.

A second method is to look for a trend in successive transition speed samples for each head over time. Measuring the transition speed once per day and saving the results in a reserved area on the disk drive will permit recall for trend analysis. The trend analysis is shown in the flow chart of FIG. 7. Here a trend based on N equal to or greater than two measurements is given. If the slope and intercept analysis indicates that a threshold value has been exceeded, a warning is issued and the measurement and analysis cycle is terminated. When the measurement cycle has been completed with respect to all head/disk combinations, the transition speed is compared with the moving average or the average value of a selected number of the immediately prior samples of transition speed values. If this comparison shows little or no difference, the time between recalibration cycles can be increased to enhance drive performance without impairing the low power operating mode or the monitoring function. Likewise, if more than a normal transition speed variation is found, the time between calibration cycles can be shortened to more closely follow conditions.

Figure 8:
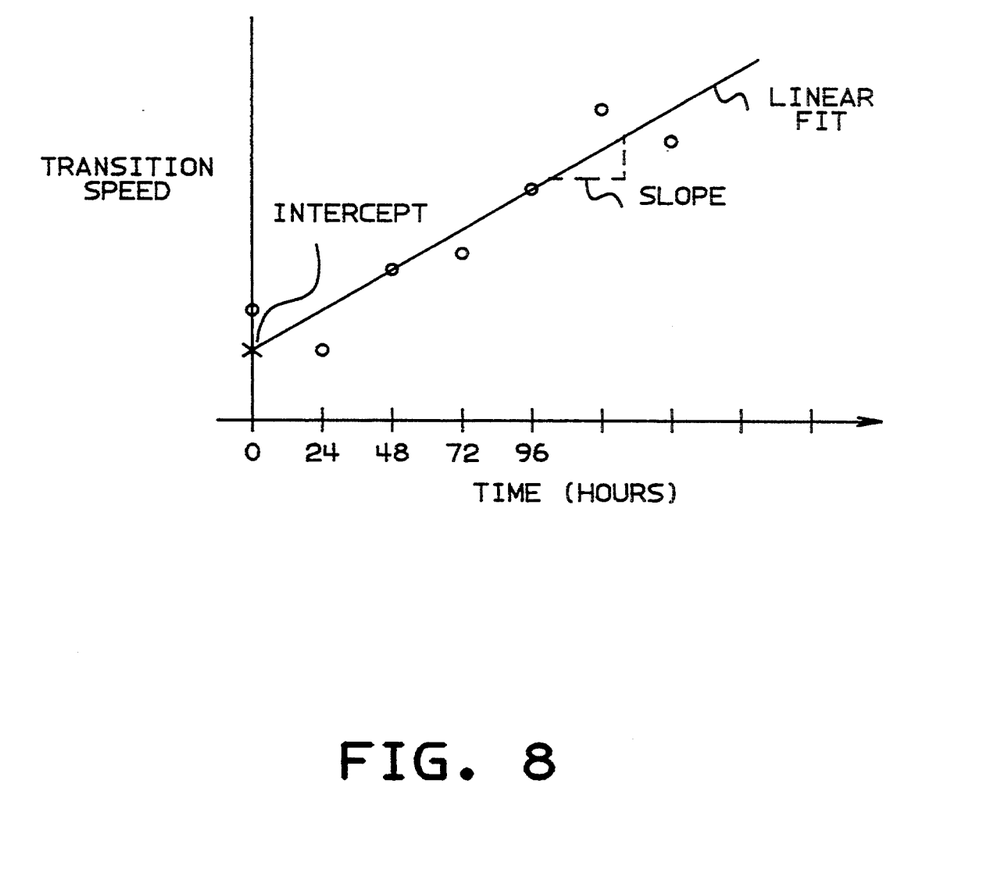
FIG. 8 shows the application of a linear fit to a sequence of transition speed samples to establish slope and intercept values for the disk drive condition monitoring function.

FIG. 8 shows an example of the slope and intercept of the transition speed trend line based on seven measurements of transition speed for a given head.

The time interval at which transition speed sampling measurement cycles are caused to occur can be made adaptable based upon whether there has been a significant change over the last N measurements. Based on the trend analysis, for example, the slope and intercept data for each head can be used to establish a new time interval. If the slope of the line shown in FIG. 8 is less than a certain value, the time interval can be extended. If on the other hand, the slope and/or intercept are too large, the interval can be reduced so that more frequent checks are made.

Various stages of reduced power can be invoked to achieve a compromise between maximum power saving and drive response time. These can be preset to a set of default settings or established by the user where the drive application and usage recommend alternate settings. As an example, after a first period of drive read/write inactivity of 10 seconds the spindle speed is reduced by 10%. Following a second period of 20 seconds of inactivity, the speed is reduced a further 10% and at one minute of read/write inactivity, the spindle speed is reduced to the transition speed. Thus, during frequent accesses, the drive is at full operational speed with the time required to restore the operational speed and bring the drive to a ready condition being increased by increments as the duration of idleness expands.

The recalibration of the power-saving lowered spindle speed by measuring and recording the head/disk clearance for each head at multiple spindle speeds requires an extended time period, such as 35 seconds. Accordingly, such recalibration will be inhibited if the drive is in any mode other than the full power-saving idle mode. It should be unnecessary to recalibrate the low-power spindle idle mode more frequently than after each 24 hours of drive power on time and if it is found that little or no modification of the power-saving spindle idle speed is being made, the elapsed time between recalibration cycles may be increased by the control system. This can be achieved by storing and comparing the last four calibrated values. If there is no change, the recalibration interval is extended. If the current value shows a change in excess of a normal deviation or exceeds a threshold, the recalibration interval is shortened to more closely follow conditions that appear to be encountering an accelerated rate of change.

Using the capability of the drive control electronics and microcode to effect head/disk clearance measurements, the power-saving reduced spindle speed can be adaptively controlled to optimize the low power velocity periodically to accommodate to environmental conditions to which the disk drive is exposed, as well as changing drive attributes occasioned by factors such as age, wear or shock. The sensitivity of the measurement and control can be enhanced by sampling the head/disk clearance at each head and speed combination for numerous positions about the periphery of the disk. This will establish the angular position of the most critical clearance value.

While the invention has been particularly shown and described with reference to a preferred embodiment thereof, it will be understood by those skilled in the art that various other changes in the form and details may be made therein without departing from the spirit and scope of the invention.

What is claimed is:

1. In a disk storage device including at least one disk and a plurality of transducer heads mounted for writing data on and reading data from the surface of the disk when the disk is rotated at an operational rotational velocity causing the transducer heads to fly above the surface of the disk separated therefrom by a film of fluid and wherein said transducer heads rest on the confronting disk surface when the disk is not rotated, an energy saving reduced speed operating mode comprising means for identifying which one of said plurality of transducer heads has the highest transition speed at which it flies above the confronting disk surface with a predetermined minimum clearance therebetween;

means for measuring the clearance between said one transducer head and said confronting disk surface; and a feedback control system effective to control the disk rotational velocity to maintain at least said highest transition speed during said energy saving reduced speed operating mode.

2. The disk storage device of claim 1 wherein said means for measuring the clearance between said transducer head and said confronting disk surface is a digital harmonic ratio flyheight (HRF) measurement effected by in-situ components of the disk storage device.

3. The disk storage device of claim 2 wherein the means for identifying the transducer head with the highest transition speed comprises means for implementing a multistep spin-up of the disk speed with respect to each head to establish the comparative landing speeds of the respective heads to enable selection of the head with the highest landing speed.

4. The disk storage device of claim 1 further comprising low power control means for invoking said reduced speed operating mode following a predetermined time lapse during which no read or write commands are received by said storage device.

5. The disk storage device of claim 4 wherein said reduced speed operating mode includes two stages, a first stage invoked after a first predetermined time period at which the disk rotational speed is reduced to a velocity intermediate the operational speed and the transition speed, and a second stage invoked after a second predetermined time period greater than said first predetermined time period at which the disk rotational speed is reduced to said transition speed, whereby during said first stage the disk can be quickly restored to operational velocity and during the second stage maximum power savings are realized.

6. The disk storage device of claim 5 further comprising adjustment means for enabling the user of the disk storage device to alter said first and second predetermined time periods.

7. In a disk storage device including at least one disk and a plurality of transducer heads mounted for writing data on and reading data from the surface of the disk when the disk is rotated at an operational rotational velocity causing the transducer heads to fly above the surface of the disk separated therefrom by a film of fluid and wherein said transducer heads rest on the confronting disk surface when the disk is not rotated, a method of energy saving using reduced disk rotational speed comprising measuring head disk separation with respect to each head at varying velocities of disk rotation to determine the respective transition speeds;

selecting the head with the highest transition speed;

sensing an idle condition wherein read or write activity has not occurred during a predetermined time period; and upon sensing an idle condition, regulating disk rotational velocity by closed loop sensing, to maintain the relative motion between transducer heads and disk at a reduced speed which is above said highest transition speed.

8. The method of claim 7 further comprising the initial step of positioning the transducer heads in alignment with a selected track.

9. The method of claim 8 wherein the step of regulating disk rotational velocity includes maintaining a transition speed that is incrementally above the highest landing speed to preclude any significant contact with disk asperities.

10. The method of claim 8 wherein said step of regulating disk rotational velocity includes two stages, a first stage invoked after a first predetermined idle time period at which the disk rotational speed is reduced to a velocity intermediate the operational speed and the transition speed, and a second stage invoked after a second predetermined idle time period subsequent to said first predetermined time period at which the disk rotational speed is reduced to said transition speed, whereby during said first stage the disk can be quickly restored to operational velocity and during the second stage maximum power savings are realized.

11. In a disk storage device including at least one disk and a plurality of transducer heads mounted for writing data on and reading data from the surface of the disk when the disk is rotated at an operational velocity whereat the transducer heads fly above the surface of the disk and are separated therefrom by a film of fluid and wherein said transducer heads rest on the confronting disk surface when the disk is not rotated, an energy saving reduced speed operating mode comprising a spindle motor connected to rotate said at least one disk;

means for measuring the clearance between each transducer head and the confronting disk surface at the "take-off" speed at which each transducer head takes-off or initially flies above the confronting disk surface;

means for identifying which one of said plurality of transducer heads has the highest take-off speed; and control means which senses disk rotational velocity and controls said spindle motor to maintain a disk rotational velocity that is at least equal to the take-off speed of said head with the highest take-off speed, to maintain the relative speed of said one of said transducers with respect to the confronting disk surface at least at said highest take-off speed during said energy saving reduced speed operating mode.

12. The disk storage device of claim 11 wherein said control means regulates said disk rotational velocity to maintain, during said energy saving reduced speed operating mode, a transition speed relative to said one transducer with the highest take-off speed that is incrementally above the take-off speed, whereby incidental contact between said plurality of transducer heads and the asperities and irregularities of the confronting disk surface are reduced.

13. The disk storage device of claim 12 wherein the means for identifying the transducer head with the transition speed comprises means for implementing a multistep spin up of the disk speed with respect to each head to establish the comparative landing speeds of the respective heads to enable selection of the head with the highest landing speed.

14. The disk storage device of claim 12 further comprising low power control means for invoking said reduced speed operating mode following a predetermined time lapse during which no read or write commands are received by said storage device.

15. The disk storage device of claim 14 wherein said reduced speed operating mode includes two stages, a first stage invoked after a first predetermined time period at which the disk rotational speed is reduced to a velocity intermediate the operational speed and the transition speed, and a second stage invoked after a second predetermined time period greater than said first predetermined time period at which the disk rotational speed is reduced to said transition speed, whereby during said first stage the disk can be quickly restored to operational velocity and during the second stage maximum power savings are realized.

16. The disk storage device of claim 12 wherein said control means further establishes a transition speed which is incrementally above said take-off speed, whereby the head flies above the confronting disk surface and substantially all the asperities projecting therefrom.

17. The disk storage device of claim 16 further comprising means for comparing said transition speed to a threshold value and means for issuing a warning if said threshold value is equalled or exceeded.

18. The disk storage device of claim 16 further comprising means for periodically redetermining said transition speed.

19. The disk storage device of claim 18 wherein, if the redetermined transition speed varies from the previously determined transition speed by a insignificant value, the period between transition speed determinations is extended.

20. The disk storage device of claim 18 further comprising means for reducing the time between redeterminations of transition speed when the redetermined transition speed varies from the previously determined transition speed by more than a predetermined amount.

21. The disk storage device of claim 18 further comprising
   means for storing a predetermined number of the immediately preceding transition speeds and averaging said predetermined number of transition speeds to form a moving average value and
   means for comparing said moving average value with the current transition speed value.

22. The disk storage device of claim 21 further comprising
   means for extending the period between transition speed determinations when the current transition speed varies from the previous transition speed by less than a predetermined value and for reducing the period between transition speed determinations when the transition speed varies from the previous transition speed by more than a predetermined value.

* * * * *